(12) United States Patent
Dittmer

(10) Patent No.: US 6,402,109 B1
(45) Date of Patent: Jun. 11, 2002

(54) SELF-BALANCING MOUNTING SYSTEM FOR A FLAT PANEL DISPLAY

(75) Inventor: Jay Dittmer, Prior Lake, MN (US)

(73) Assignee: Chief Manufacturing, Inc., Savage, MN (US)

( * ) Notice: Subject to any disclaimer, the term of this patent is extended or adjusted under 35 U.S.C. 154(b) by 0 days.

(21) Appl. No.: 09/858,967

(22) Filed: May 16, 2001

(51) Int. Cl.[7] .................................................. E04G 3/00
(52) U.S. Cl. ............................. 248/284.1; 248/279.1; 248/480
(58) Field of Search ........................... 248/284.1, 278.1, 248/285.1, 287.1, 244, 242, 480, 485

(56) References Cited

U.S. PATENT DOCUMENTS

| | | | | |
|---|---|---|---|---|
| 749,670 A | * | 1/1904 | Gardner ....................... 248/242 |
| 1,782,175 A | * | 11/1930 | Pearmain .................. 248/284.1 |
| 3,485,382 A | * | 12/1969 | Larson ........................ 211/150 |
| 3,667,714 A | * | 6/1972 | Zizylek, Jr. .................. 284/264 |
| 3,759,475 A | | 9/1973 | Brown ........................ 248/277 |
| 4,687,305 A | * | 8/1987 | Harris, Jr. et al. ........... 350/624 |
| 4,805,904 A | * | 2/1989 | Nye ........................ 273/1.5 R |
| 4,881,734 A | * | 11/1989 | Nye ........................ 273/1.5 R |
| 4,964,606 A | | 10/1990 | Beam et al. ................. 248/333 |
| 5,108,063 A | * | 4/1992 | Koerber, Sr. et al. ....... 248/284 |
| 5,484,127 A | * | 1/1996 | Mower et al. ............ 248/284.1 |
| 5,809,908 A | | 9/1998 | Catta et al. .................. 108/147 |
| 5,842,672 A | | 12/1998 | Sweere et al. ............ 248/278.1 |
| 5,918,841 A | | 7/1999 | Sweere et al. .......... 248/123.11 |
| 5,924,665 A | | 7/1999 | Sweere et al. ............ 248/285.1 |
| 5,947,429 A | | 9/1999 | Sweere et al. .......... 248/123.11 |
| 5,967,479 A | | 10/1999 | Sweere et al. .......... 248/280.11 |
| 5,992,809 A | | 11/1999 | Sweere et al. ........... 248/278.1 |
| 6,012,693 A | | 1/2000 | Voeller et al. .......... 248/280.11 |
| 6,015,120 A | | 1/2000 | Sweere et al. .......... 248/123.11 |
| 6,019,332 A | | 2/2000 | Sweere et al. ........... 248/284.1 |

\* cited by examiner

Primary Examiner—Leslie A. Braun
Assistant Examiner—A. Joseph Wujciak
(74) Attorney, Agent, or Firm—Faegre & Benson LLP

(57) ABSTRACT

A self-balancing mounting system for a flat panel display including a first bracket having a first pivot point and a second bracket having a first sliding pivot mechanism with a sliding range of motion located below the first pivot point relative to a vertical axis. The second bracket includes a range of motion between a generally vertical position and a tipped forward position. A minor arm having a first end is pivotally attached to the first pivot point on the first bracket and a second end is pivotally engaged with the first sliding pivot mechanism on the second bracket such that a first force causing the second bracket to tip forward biases the second end of the minor arm upward in the first sliding pivot mechanism. A major arm having a first end is pivotally attached to the minor arm at a location between the first and second ends of the minor arm and a second end is mechanically coupled to the second bracket at a location below the first sliding pivot mechanism such that a second force on major arm biases the second end of the minor arm downward in the first sliding pivot mechanism.

19 Claims, 6 Drawing Sheets

SELF-BALANCING MOUNTING SYSTEM FOR A FLAT PANEL DISPLAY

FIELD OF THE INVENTION

The present invention is directed to a self-balancing mounting system for a flat panel display that permits a single operator to tip the flat panel display forward to a desired angle without any additional adjustment or locking mechanisms.

BACKGROUND OF THE INVENTION

Flat panel displays have become an increasingly popular substitute for projection devices and CRT's. The flat panel display is typically mounted on a structure, such as a wall. Ideally, the angle of the flat panel display relative to vertical can be adjusted for optimum viewing. Various prior art positioning devices have been used, such as friction based hinges, mechanical linkages with springs or other biasing device, and various mechanical latches. The friction based devices need to be sufficiently strong to hold the relatively heavy flat panel displays, while being easy to operate. Friction based devices and mechanical latches typically require one person to hold the flat panel display at the correct angle, while a second person engages the device. Movement in the upward direction requires the operator to lift a substantial portion of the weight of the flat panel display. In some instances, the operator must also overcome the resistance of the positioning device.

Mechanical linkages with springs are expensive to build. For example, U.S. Pat. No. 5,842,672 (Sweere et al.) discloses a multi-jointed, pivoted support arm to support and position of a flat panel display or a keyboard that uses a nitrogen gas spring counterbalance mechanism. What is needed is a low-cost, easy to operate, and maintenance free system for mounting and positioning flat panel displays.

BRIEF SUMMARY OF THE INVENTION

The present invention is directed to a self-balancing mounting system for a flat panel display, such as a plasma display, that permits a single operator to tip the flat panel display forward to a desired angle without any additional adjustment or locking mechanisms.

The self-balancing mounting system for a flat panel display comprises a first bracket having a first pivot point and a second bracket having a first sliding pivot mechanism with a sliding range of motion located below the first pivot point relative to a vertical axis. The second bracket comprises a range of motion between a generally vertical position and a tipped forward position. A minor arm having a first end is pivotally attached to the first pivot point on the first bracket and a second end is pivotally engaged with the first sliding pivot mechanism on the second bracket such that a first force causing the second bracket to tip forward biases the second end of the minor arm upward in the first sliding pivot mechanism. A major arm having a first end is pivotally attached to the minor arm at a location between the first and second ends of the minor arm and a second end is mechanically coupled to the second bracket at a location below the first sliding pivot mechanism such that a second force biases the second end of the minor arm downward in the first sliding pivot mechanism.

The combination flat panel display and second bracket comprises a virtual pivot point in front of the second bracket on a side opposite the first bracket. The first and second forces comprise gravity. In one embodiment, the sliding range of motion of the first sliding pivot mechanism limits the range of motion for the second bracket. The second bracket comprises an equilibrium 2 position about half way through its range of motion. The first and second forces are generally equal, but in a generally opposite direction.

In one embodiment, the first sliding pivot mechanism comprises a slot in the second bracket. In another embodiment, the second end of the major arm comprises a pivotal attachment to a second sliding pivot mechanism located on the first bracket at a location below the first sliding pivot mechanism and a connecting arm pivotally coupling the second end of the major arm with the second bracket. The second sliding pivot mechanism typically comprises a slot in the first bracket.

The first bracket may include various wall mounting holes and conduit holes. The second bracket can include a plurality of flat panel display mounting mechanisms and a flat panel display locking mechanism. The system optionally includes at least one bottom support for retaining a bottom portion of the second bracket in a fixed spaced relationship relative to the first bracket.

The present invention is also directed to an adjustable display system comprising the present self-balancing mounting system and a flat panel display mounted to the second bracket.

BRIEF DESCRIPTION OF THE SEVERAL VEIWS OF THE DRAWING

DETAILED DESCRIPTION OF THE INVENTION

Figure 1:
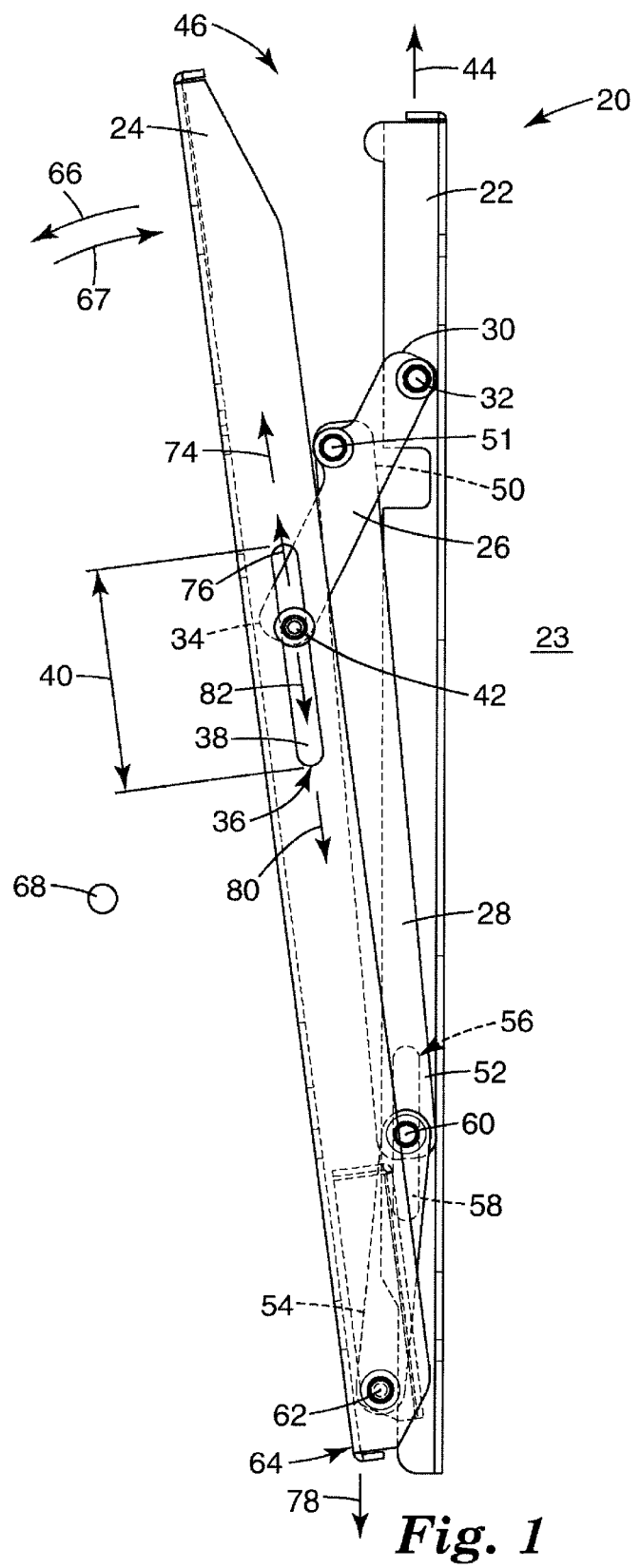
FIG. 1 is a side view of a self-balancing mounting mechanism in a partially open configuration in accordance with the present invention.

FIG. 1 is a side view of a self-balancing mounting mechanism 20 in accordance with the present invention. First bracket 22 is typically mounted to a structure 23, such as a wall. Second bracket 24 is pivotally attached to the first bracket 22. The linkage between the first bracket 22 and the second bracket 24 includes a minor arm 26 and a major arm 28. The minor arm 26 includes a first end 30 that is pivotally attached to the first bracket 22 at pivot point 32. Second end 34 of the minor arm 26 is attached to the second bracket 24 at pivot point 42 mechanically coupled with sliding pivot mechanism 36. In the illustrated embodiment, the sliding pivot mechanism 36 is a slot 38. Other sliding pivot mechanisms include telescoping structures and interlocking rails.

The slot 38 comprises a length or range of motion 40 through which pivot point 42 can move. The entire range of motion 40 of the slot 38 is preferably located at or below the height of the pivot point 32 relative to vertical axis 44.

Major arm 28 has a first end 50 pivotally attached to the minor arm 26 at pivot point 51 between the first end 30 and the second end 34. Second end 52 of the major arm 28 is mechanically coupled with the second bracket 24 using a variety of mechanisms. In the illustrated embodiment, second end 34 is coupled to the second bracket 24 by connecting arm 54. The second end 52 of the major arm 28 and one end of the connecting arm 54 are both mechanically coupled to sliding pivot mechanism 56 at pivot point 60 located on the first bracket 22. The sliding pivot mechanism 56 is a slot 58. The other end of the connecting arm 54 is pivotally attached to the pivot point 62 on the second bracket 24.

The combination of the major arm 28 and the connecting arm 54 comprise a tension member that will be discussed in further detail below. The connecting arm 54 serves to prevent the bottom portion 64 of the second bracket 24 from being separated from the first bracket 22 more than a fixed amount (see FIG. 6). In an alternate embodiment, the second end 52 of the major arm 28 can be pivotally attached directly to the bottom portion 64 of the second bracket 24. The precise location of the pivot point 60 can vary with the application as long as it is located below the range of motion 40 of the sliding pivot mechanism 36 relative to the vertical axis 44.

In operation, a flat panel display 70 (see FIGS. 5 and 6) is mounted to the second bracket 24. The combined weight of the flat panel display 70 and the second bracket 24 comprise a virtual pivot point 68 located in front of the second bracket 24 on the side opposite the first bracket 22. The combined weight of the flat panel display screen 70 and the second bracket 24 comprises a driving force that causes the second bracket 24 to tip forward in the direction 66. This forward movement in the direction 66 has the effect to bias the pivot 42 at the second end 34 of the minor arm 26 upward in a direction 74 within slot 38.

Simultaneously, the force of gravity on the flat panel display screen 70 and the second bracket 24 creates a downward force 78. The force 78 is transmitted through the connecting arm 54 and the major arm 28 to the pivot point 51 on the minor arm 26. The resulting force 78 biases the minor arm 26, and hence the pivot 42 at the second end 34 of the minor arm 26 in a direction 80, opposite the direction 74. The result is that an equilibrium point 46 (see FIG. 1) is established somewhere in range of motion 81, preferably near a midpoint within the range of motion 81. The location of the equilibrium point 46 will depend upon the mass and moment of inertia of the flat panel display 70 being used. When positioned at or near the equilibrium point 46, the biasing forces 76 and 82 are generally offset by each other so that the flat panel display 70 will remain where positioned with minimal friction.

Friction can be provided by one or more of the pivot points 32, 42, 51, 60 and 62. The self-balancing nature of the present system 20 means that movement in either the direction 66 or the return direction 67 only requires a force generally equal to the friction in the system 20. The operator does not need to carry the weight of the flat panel display 70 to move the system 20 in the directions 66 or 67.

At some position along the range of motion 81, the resultant biasing force 82 is substantially equal to, but opposite from the biasing force 76. As a result of friction at the pivot points, however, the second bracket 24 can be positioned anywhere within its range of motion 81 (see FIG. 2). Once the second bracket 24 is in the desired location, the pivot 42 will maintain its location within the slot 38. This self-balancing feature permits a single operator to tip the flat panel display forward in the direction 66 to the desired angle (or upward in the direction 67) with one hand. No additional adjustments or locking mechanisms are required. The flat panel display will retain the desired position until an external force acts upon it to move it to a new location.

In one embodiment, the configuration of the linkage is optimized so that the second bracket 24 is in equilibrium 46 when the pivot 42 is about at the center of the range of motion 40. Positioning the pivot 42 at some other location along the range of motion 40, while not precisely at the equilibrium point, is possible because of the friction inherent in the system. That is, the self-balancing feature discussed above in combination with the friction inherent in the system 20 permits the second bracket 24 to be positioned at any location within the range of motion 80.

Figure 2:
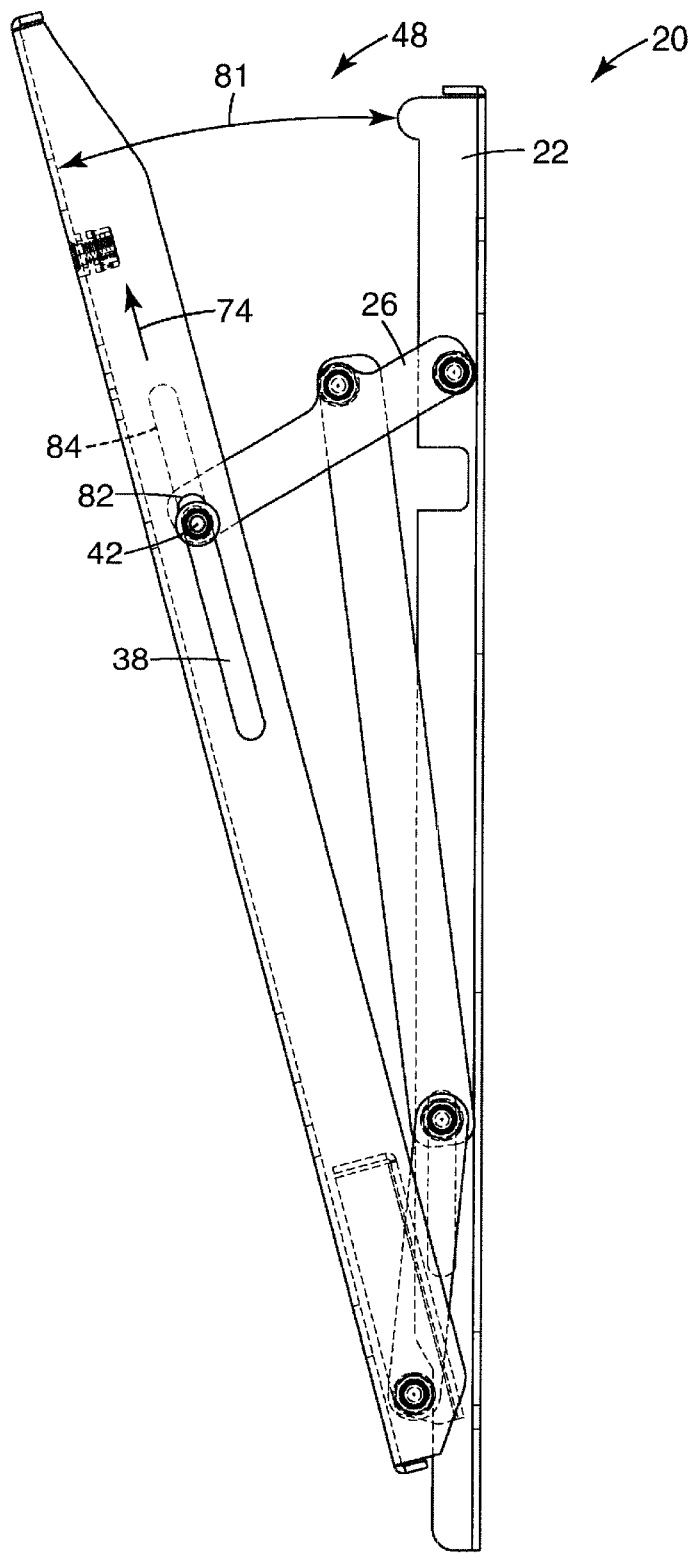
FIG. 2 is a side sectional view of the self-balancing mounting mechanism of FIG. 1 in a open position.

FIG. 2 is a side view of the self-balancing mounting mechanism 20 of FIG. 1. The second bracket 24 is moved to the extreme of its range of motion 81 to open position 48. In the configuration of FIG. 2, the pivot 42 is at or near top 82 of the slot 38. The range of motion 80 can be increased by extending the slot 38 in a direction 74 until the minor arm 26 is about perpendicular to the second bracket 24. The proposed extension of the slot 38 is showed in dashed lines and identified with reference numeral 84. Once the minor arm 26 is perpendicular to the second bracket 24, the biasing force 76 goes to zero. Consequently, the sliding pivot mechanism 36 is located below the pivot point 32.

Figure 3:
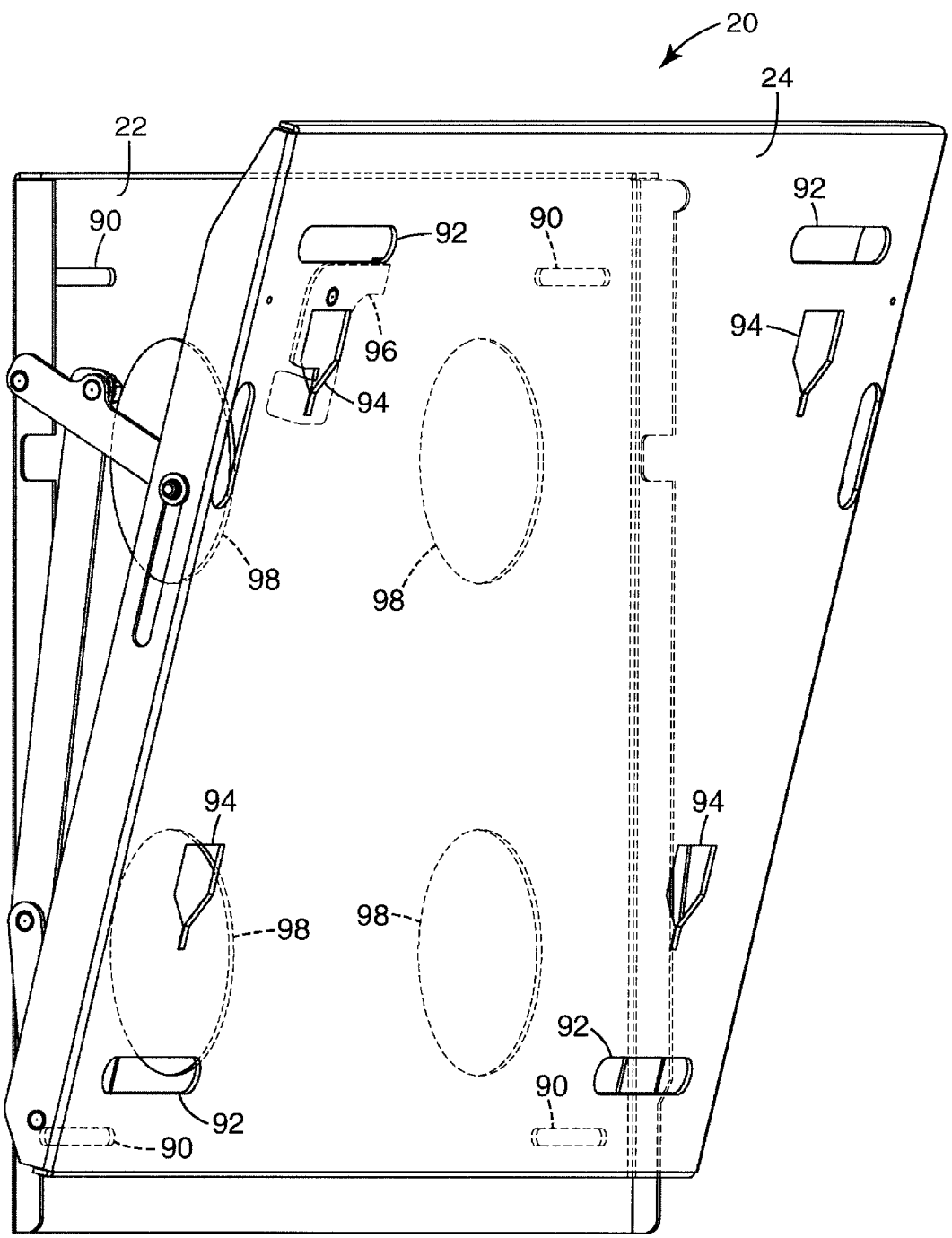
FIG. 3 is a prospective view of the self-balancing mounting mechanism of FIG. 2.

FIG. 3 is a perspective view of the self-balancing mounting mechanism 20 of FIG. 2 in the open position. The first bracket 22 includes a series of mounting holes 90. The second bracket 24 may optionally include corresponding access holes 92 so that the mounting holes 90 can be accessed. The number, location and size of the mounting holes 90 and access holes 92 can vary with the application. The second bracket 24 also includes a plurality of panel mounting slots 94 and a panel lock 96 used to secure the flat panel display 70 to the system 20. Finally, the first bracket 22 optionally includes a plurality of conduit holes 98 through which wiring for the flat panel display 70 can be passed.

Figure 4:
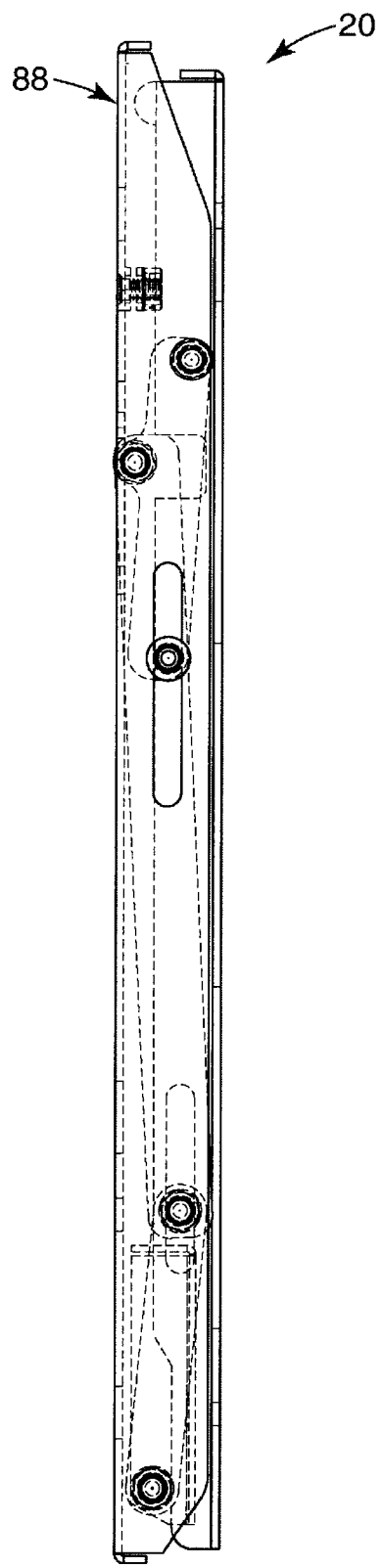
FIG. 4 is a side sectional view of the self-balancing mounting mechanism of FIG. 1 in a closed position.

FIG. 4 is a side view of the self-balancing mounting mechanism 20 of FIG. 1 in the fully closed position 88. The self-balancing nature of the mechanism 20 obviates the need for a latch or other mechanism to retain the system 20 in the vertical or fully closed position 88.

Figure 5:
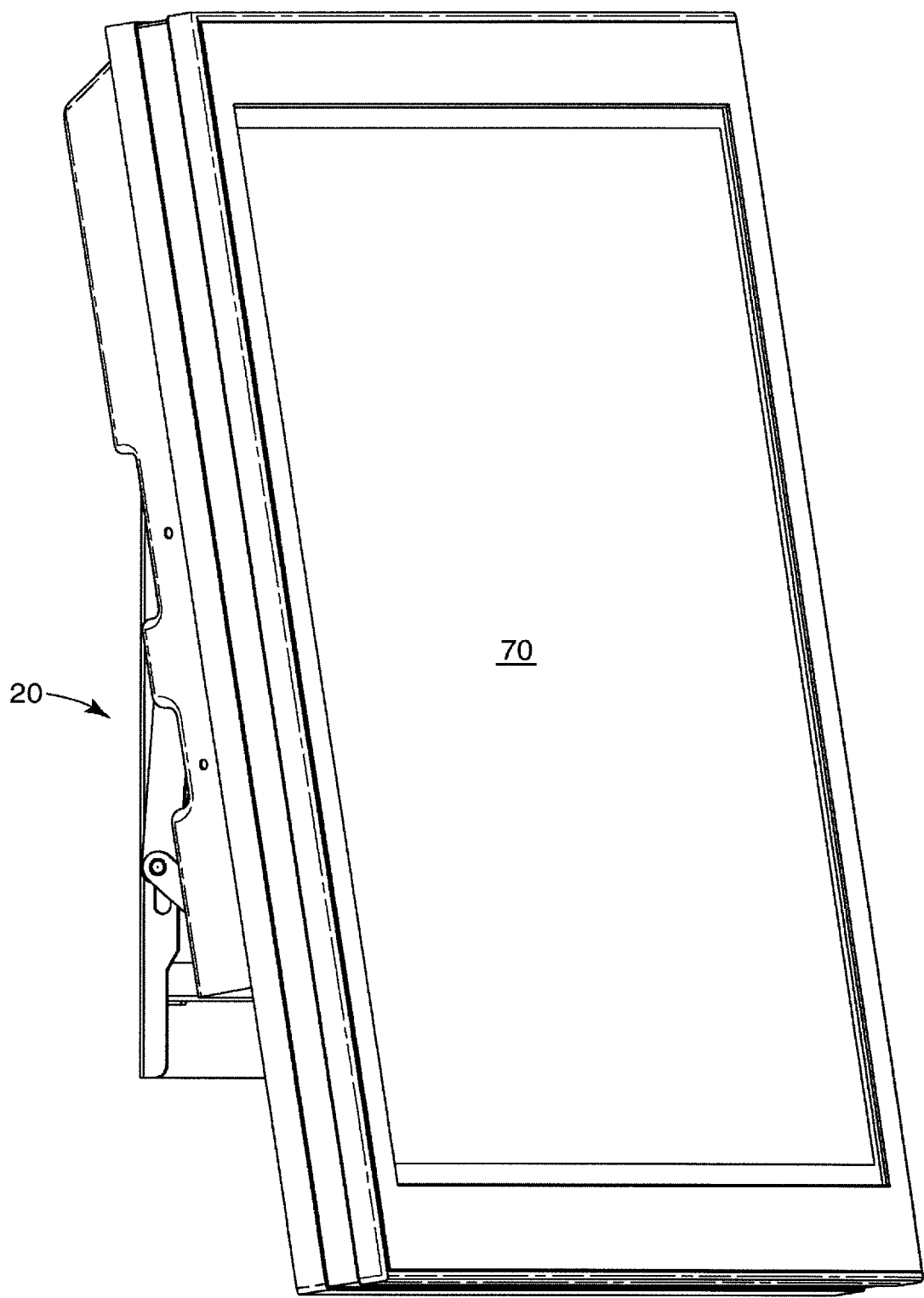
FIG. 5 is a prospective view of a flat panel display mounted to a self-balancing mounting mechanism in accordance with the present invention.
Figure 6:
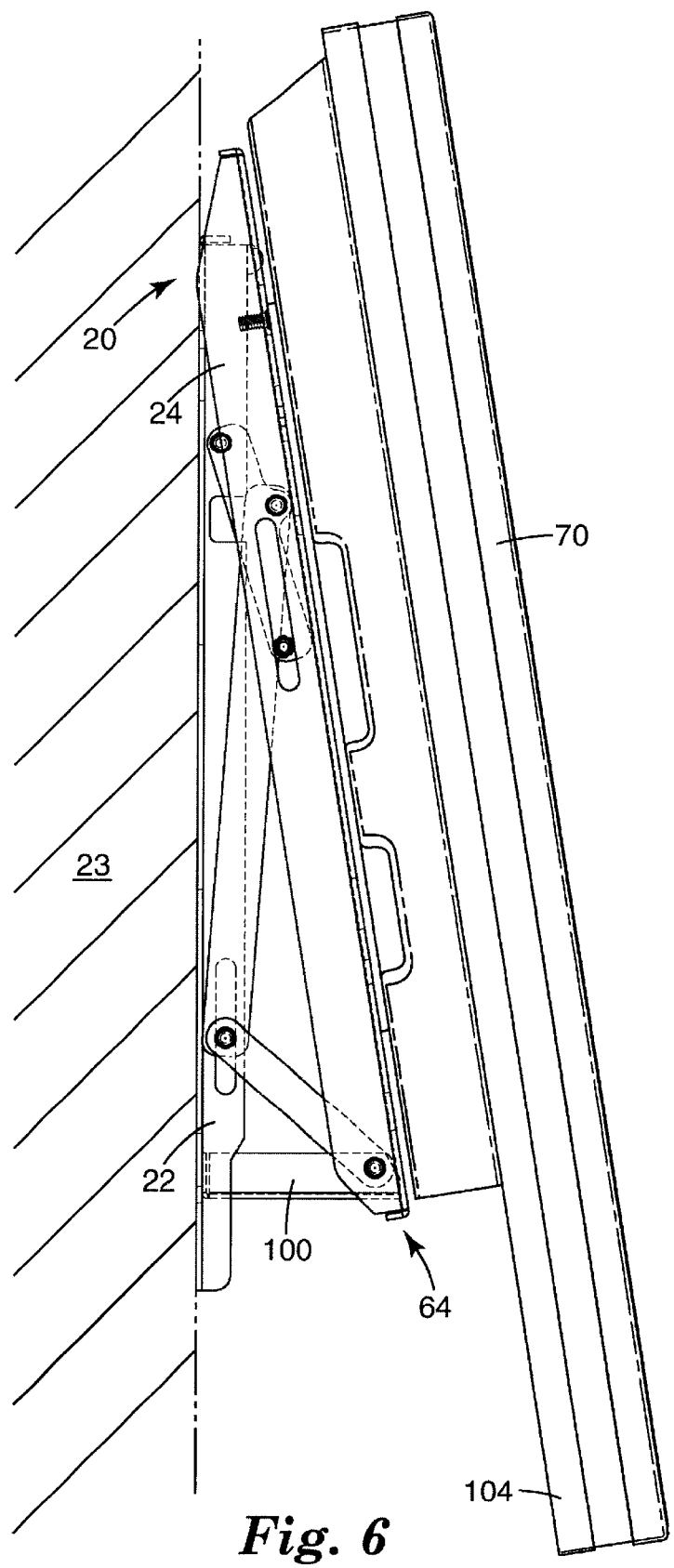
FIG. 6 is a side view of the flat panel display and self-balancing mounting mechanism of FIG. 5.

FIGS. 5 and 6 illustrate a flat panel display 70 mounted to the self-balancing mounting mechanism 20 in accordance with the present invention. In the embodiment illustrated in FIGS. 5 and 6, folding spacer arms 100 are extended from the bottom portion 64 of the second bracket 24 to retain the flat panel display 70 in a fixed relationship with respect to the first bracket 22 and wall 23. The spacer arms 100 are particularly useful for accessing back portion 104 of the flat panel display 70, such as to connect wiring and other components.

All of the patents and patent applications disclosed herein, including those set forth in the Background of the Invention, are hereby incorporated by reference. Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

What is claimed is:

1. A self-balancing mounting system for a flat panel display comprising:

a first bracket having a first pivot point;

a second bracket having a first sliding pivot mechanism with a sliding range of motion located below the first pivot point relative to a vertical axis, the second bracket comprising a range of motion between a generally vertical position and a tipped forward position;

a minor arm having a first end pivotally attached to the first pivot point on the first bracket and a second end pivotally engaged with the first sliding pivot mechanism on the second bracket such that a first force causing the second bracket to tip forward biases the second end of the minor arm upward in the first sliding pivot mechanism; and a major arm having a first end pivotally attached to the minor arm at a location between the first and second ends of the minor arm and a second end mechanically coupled to the second bracket at a location below the first sliding pivot mechanism such a second force biases the second end of the minor arm downward in the first sliding pivot mechanism.

2. The system of claim 1 wherein the combination flat panel display and second bracket comprises a virtual pivot point in front of the second bracket on a side opposite the first bracket.

3. The system of claim 1 comprising an equilibrium position where the first and second forces generally offset from each other so that the second bracket remains where positioned with minimal friction.

4. The system of claim 1 comprising an equilibrium position about half way through the range of motion of the second bracket.

5. The system of claim 1 wherein the first force is generally equal to, but in a generally opposite direction from, the second force when the second bracket is about half way through its range of motion.

6. The system of claim 1 wherein the first and second forces on the second bracket comprises gravity.

7. The system of claim 1 wherein the first and second forces on the second bracket comprises gravity acting on the second bracket and the flat panel display.

8. The system of claim 1 wherein the sliding range of motion of the first sliding pivot mechanism limits the range of motion for the second bracket.

9. The system of claim 1 comprising a frictional force between the second end of the minor arm and the first sliding pivot mechanism.

10. The system of claim 1 comprising a frictional force between the second end of the major arm and the second bracket.

11. The system of claim 1 wherein the first sliding pivot mechanism comprises a slot in the second bracket.

12. The system of claim 1 wherein the second end of the major arm comprises:

a pivotal attachment to a second sliding pivot mechanism located on the first bracket at a location below the first sliding pivot mechanism; and a connecting arm pivotally coupling the second end of the major arm with the second bracket.

13. The system of claim 12 wherein the second sliding pivot mechanism comprises a slot in the first bracket.

14. The system of claim 1 wherein the first bracket comprises a plurality of wall mounting holes.

15. The system of claim 1 wherein the first bracket comprises at least one conduit hole.

16. The system of claim 1 wherein the second bracket comprises a plurality of flat panel display mounting mechanisms.

17. The system of claim 1 wherein the second bracket comprises a flat panel display locking mechanism.

18. The system of claim 1 comprising at least one bottom support for retaining a bottom portion of the second bracket in a fixed spaced relationship relative to the first bracket.

19. An adjustable display system comprising:

a self-balancing mounting system comprising;

a first bracket having a first pivot point mounted to a support structure;

a second bracket having a first sliding pivot mechanism with a sliding range of motion located below the first pivot point relative to a vertical axis, the second bracket comprising a range of motion between a generally vertical position and tipped forward position;

a minor arm having a first end pivotally attached to the first pivot point on the first bracket and a second end pivotally engaged with the first sliding pivot mechanism on the second bracket such that a first force causing the second bracket to tip forward biases the second end of the minor arm upward in the first sliding pivot mechanism; and a major arm having a first end pivotally attached to the minor arm at a location between the first and second ends of the minor arm and a second end mechanically coupled to the second bracket at a location below the first sliding pivot mechanism such that a second force biases the second end of the minor arm downward in the first sliding pivot mechanism; and a flat panel display mounted to the second bracket.

* * * * *